(12) United States Patent
Uesugi (10) Patent No.: US 8,758,643 B2
(45) Date of Patent: Jun. 24, 2014

(54) METHOD OF PRODUCING MAGNESIUM-BASED HYDRIDES

(75) Inventor: Hiroshi Uesugi, Yokohama (JP)

(73) Assignee: Bio Coke Lab. Co. Ltd, Tokyo (JP)

( * ) Notice: Subject to any disclaimer, the term of this patent is extended or adjusted under 35 U.S.C. 154(b) by 1218 days.

(21) Appl. No.: 12/666,155

(22) PCT Filed: Jul. 24, 2009

(86) PCT No.: PCT/JP2009/003505
§ 371 (c)(1),
(2), (4) Date: Dec. 22, 2009

(87) PCT Pub. No.: WO2010/100684
PCT Pub. Date: Sep. 10, 2010

(65) Prior Publication Data
US 2011/0147651 A1 Jun. 23, 2011

(30) Foreign Application Priority Data
Mar. 5, 2009 (JP) ................. 2009-052235

(51) Int. Cl.
*C01B 6/04* (2006.01)
*C01B 3/02* (2006.01)
(52) U.S. Cl.
USPC ................. 252/188.26; 252/188.25; 423/647
(58) Field of Classification Search
USPC .................. 423/647; 252/188.25, 188.26
See application file for complete search history.

(56) References Cited

U.S. PATENT DOCUMENTS

| | | | |
|---|---|---|---|
| 4,259,110 A * | 3/1981 | Pezat et al. | ............ 423/644 |
| 5,198,207 A | 3/1993 | Knott et al. | |
| 5,964,965 A | 10/1999 | Schulz et al. | |
| 6,193,929 B1 | 2/2001 | Ovshinsky et al. | |
| 6,680,042 B1 | 1/2004 | Schulz et al. | |
| 2004/0142203 A1 | 7/2004 | Woolley | |
| 2008/0279762 A1 | 11/2008 | Akiyama et al. | |

FOREIGN PATENT DOCUMENTS

| | | |
|---|---|---|
| CA | 2150841 A | 12/1995 |
| DE | 10 2005 019108 A1 | 10/2006 |
| EP | 0 685 425 A1 | 12/1995 |
| GB | 2 013 532 A | 8/1979 |
| JP | 7-330305 A | 12/1995 |
| JP | 2004-511652 A | 4/2004 |
| JP | 2004-512254 A | 4/2004 |
| JP | 2008-44832 A | 2/2008 |
| JP | 2008-239367 A | 10/2008 |

OTHER PUBLICATIONS

Jeon K J et al.; "Enhanced hydrogen absorption kinetics for hydrogen storage using Mg flakes as compared to conventional spherical powders"; Journal of Power Sources, Elsevier SA, CH, vol. 183, No. 2; Sep. 1, 2008; pp. 693-700.
Kuji "Hydrogen Absorption Properties of Mg-Ni Alloys Prepared by Bulk Mechanical Alloying", Metals and Materials International, vol. 7, No. 2, pp. 169-173, 2001.

* cited by examiner

*Primary Examiner* — Peter F Godenschwager
(74) *Attorney, Agent, or Firm* — Birch, Stewart, Kolasch & Birch, LLP (57) ABSTRACT

A method of producing magnesium-based hydrides is provided that can enhance production efficiency while securing safety. An Mg ingot including Mg is cut to make a number of Mg flakes. An accumulated matter made by accumulating a number of Mg flakes are compressed and shaped to form a compressed matter of Mg flakes. The compressed matter of Mg flakes is placed in hydrogen gas such that Mg reacts with hydrogen gas, to produce magnesium-based hydrides. Since the Mg flakes have a low risk of explosion, this allows safer production of magnesium-based hydrides. Moreover, compression of the Mg flakes causes distortion in the flakes, which makes it easy for Mg to react with hydrogen gas, allowing enhancement in yield of magnesium-based hydrides.

6 Claims, 11 Drawing Sheets

METHOD OF PRODUCING MAGNESIUM-BASED HYDRIDES

This application is the national phase under 35 U.S.C. §371 of PCT International Application No. PCT/JP2009/003505 which has an International filing date of Jul. 24, 2009 and designated the United States of America.

BACKGROUND OF THE INVENTION

1. Field of the Invention

The present invention relates to a method of effectively producing a magnesium-based hydride that generates hydrogen when reacted with water.

2. Description of the Related Art

Like an alkali metal hydride, $MgH_2$ (magnesium hydride) is an ionic bond hydride formed of the bonding of $Mg^{2+}$ and $H^-$ and is generated by causing Mg (magnesium) to react with high pressure hydrogen under heating. The reaction for generating $MgH_2$ is represented by the following formula (1).

$$Mg + H_2 \rightarrow MgH_2 \quad (1)$$

The powder of $MgH_2$ is charcoal gray in color and stable in air. In water, however, it reacts with water and decomposes while releasing hydrogen. Hence, it is expected that $MgH_2$ can be used as a hydrogen storage material that releases hydrogen by storing hydrogen in advance and by reacting with water as necessary. The reaction of $MgH_2$ with water is represented by the following formula (2).

$$MgH_2 + 2H_2O \rightarrow Mg(OH)_2 + 2H_2 \quad (2)$$

Japanese Patent Publication No. 4083786 discloses a method of effectively producing $MgH_2$. The technique disclosed in Japanese Patent Publication No. 4083786 keeps a material powder including magnesium in the atmosphere of hydrogen gas and removes the coating from the surface of Mg by maintaining the temperature and pressure of hydrogen gas at temperature and pressure at which Mg and $H_2$ is thermodynamically stable. Next, the temperature and pressure of hydrogen gas are maintained at temperature and pressure at which $MgH_2$ is thermodynamically stable, to cause Mg to react with $H_2$. This method enables high-yield production of $MgH_2$.

SUMMARY

It is desirable for a material Mg to be in a form of powder to produce $MgH_2$ by effectively reacting Mg with $H_2$. Moreover, the smaller the material powder is, the greater the production efficiency increases. Mg, however, has large ductility and malleability, making it technically difficult to miniaturize Mg powder beyond some extent. Furthermore, since Mg powder has a risk of dust explosion, miniaturization of Mg powder is limited for a safety reason. Currently, the minimum particle diameter of Mg powder that is stably producible is 75 μm (particle size of 200 mesh). For Mg powder of one rank larger in size, the minimum particle diameter is 150 μm (particle size of 100 mesh). Thus, miniaturization of Mg powder has such limitation, which also sets limitation in enhancement of production efficiency of $MgH_2$ by miniaturizing Mg powder.

The present invention has been contrived in view of the above circumstances. An object of the invention is to provide a method of producing magnesium-based hydrides that is able to enhance production efficiency while assuring safety by processing Mg to flakes instead of powder.

According to the present invention, a method of producing a magnesium-based hydride in which a material including magnesium is combined with hydrogen is characterized by making a compressed matter by accumulating and compressing a plurality of flakes including magnesium, and producing a magnesium-based hydride by causing a component in the compressed matter to react with hydrogen gas in an atmosphere of hydrogen gas.

According to an aspect of the method, an accumulated matter in which a number of flakes including Mg are accumulated is compressed to make a compressed matter of flakes. The compressed matter of flakes is placed in hydrogen gas such that a component including Mg reacts with hydrogen gas, to produce magnesium-based hydrides. Compressing of the flakes including Mg causes distortion in each flake, which makes it easier for Mg to react with hydrogen gas, allowing enhancement in yield of magnesium-based hydrides.

A method disclosed in the present invention is characterized in that the flakes are made by repeatedly cutting an ingot including magnesium.

According to an aspect of the method, a large number of flakes are produced by cutting a metal ingot including Mg.

A method disclosed in the present invention is characterized in that each of the flakes has a linear shape.

According to an aspect of the method, by forming each of the flakes to be linear, a large number of flakes are easily accumulated and they are also easily deformed.

A method disclosed in the present invention is characterized in that each of the flakes has a thickness of 150 μm or smaller.

According to an aspect of the method, the thickness of each flake may be 150 μm or smaller, which is equal to or smaller than the particle diameter of Mg powder.

A method disclosed in the present invention is characterized in that the compressed matter has a density of a value between 0.8 g/cm³ and 1.5 g/cm³.

According to an aspect of the method, the density of the compressed matter of flakes may be between 0.8 g/cm³ and 1.5 g/cm³, which makes the hydrogenation rate of Mg higher.

A method disclosed in the present invention is characterized in that, when the compressed matter is formed, the flakes accumulated in a mold are compressed to form the compressed matter.

According to an aspect of the method, by forming the compressed matter of flakes using a mold, each of the magnesium-based hydrides produced by causing the compressed matter to react with hydrogen gas can be determined to have a certain shape.

According to an aspect of the method, since a magnesium hydride is produced from flakes including Mg, it can be produced safer compared to the method of producing it from Mg powder which has a risk of dust explosion. Moreover, compressing of the flakes may enhance the yield of magnesium-based hydrides, allowing improvement in production efficiency of magnesium-based hydrides.

According to an aspect of the method, flakes are produced by cutting an ingot, enabling easy production of a large number of flakes with uniform components.

According to an aspect of the method, since each flake is formed to have a linear shape, a large number of flakes may be more easily accumulated compared to other shapes such as a board-like shape and the like. Moreover, such linear flake can easily be deformed, allowing easy compression. Furthermore, the compressed matter of flakes can be formed to have a desired shape.

According to an aspect of the method, each flake may have the size of a particle diameter of Mg powder or smaller. As each flake becomes thinner, Mg more easily reacts with hydrogen gas, allowing enhancement in yield of magnesium-based hydrides to be produced.

According to an aspect of the method, the compressed matter of flakes has a density of a value between 0.8 g/cm³ and 1.5 g/cm³, which causes the hydrogenation rate of Mg to be maximum, allowing maximization of the yield of magnesium-based hydrides.

According to an aspect of the method, the shape of the produced magnesium-based hydride can be determined to have a certain shape. Hence, it is possible for the magnesium-based hydride to be formed with a shape most suitable for utilization in a hydrogen generating apparatus. Moreover, hydrogen gas may effectively be generated, while the hydrogen generating apparatus may be miniaturized.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

DETAILED DESCRIPTION

Embodiment 1

Figure 1:
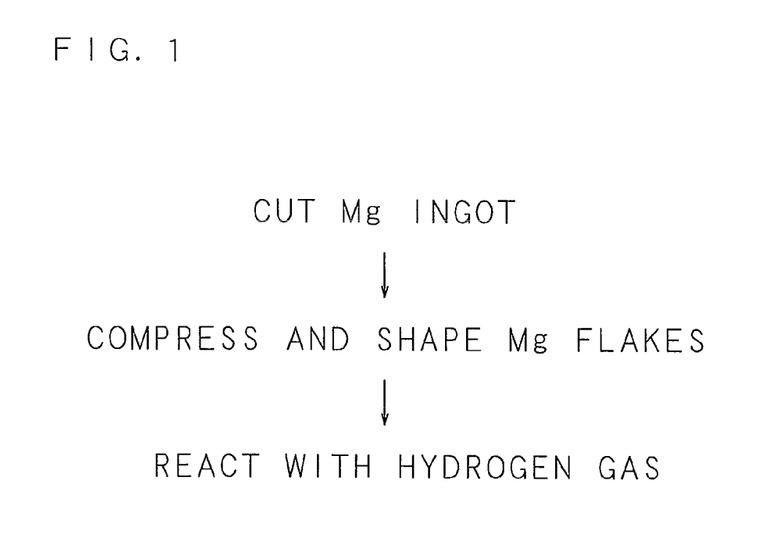
FIG. 1 is a conceptual view illustrating an overview of a method of producing magnesium-based hydrides.

FIG. 1 is a conceptual view illustrating an overview of a method of producing magnesium-based hydrides. First, an Mg ingot which is a block of single Mg is cut to make Mg flakes. Here, an Mg flake is made to have a thickness of 150 µm or smaller, e.g. 20 µm or the like. Since the minimum particle diameter of Mg powder that is currently producible is between 75 µm and 150 µm, the particle diameter of Mg powder smaller than 75 µm cannot be produced for safety reasons. In the embodiment, an Mg flake has a thickness of 150 µm or smaller, which is equal to or smaller than the particle diameter of Mg powder. It is possible for an Mg flake to have a thickness less than 75 µm, which is smaller than the particle diameter of Mg powder, by processing Mg to flakes. Next, a given number of Mg flakes are accumulated from a large number of produced Mg flakes, which are then compressed and shaped using a mold and a pressing machine to produce a compressed matter of Mg formed to have a given shape. Thereafter, the compressed matter of Mg is placed in the atmosphere of hydrogen gas to cause Mg in the compressed matter to react with hydrogen gas by regulating the temperature and pressure of hydrogen gas. The temperature and pressure of hydrogen gas is regulated using a method similar to the method disclosed in Japanese Patent Publication No. 4083786. The reaction represented by the formula (1) is generated between Mg and hydrogen gas, producing $MgH_2$ which is a magnesium-based hydride.

Figure 2:
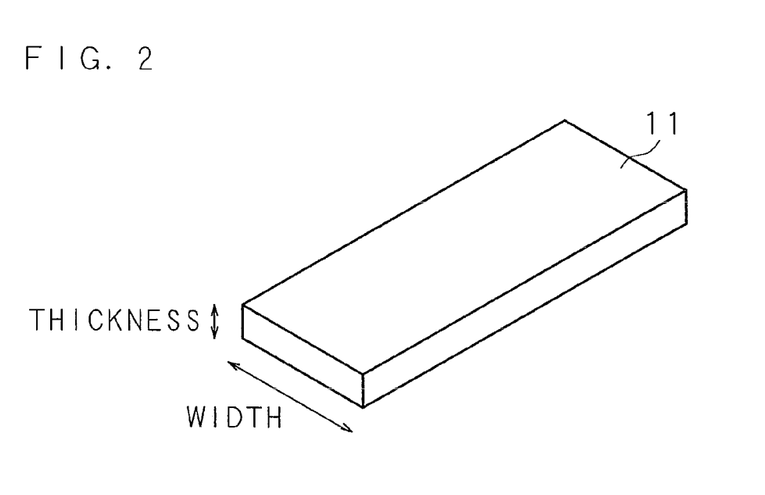
FIG. 2 is a schematic perspective view illustrating an example of an Mg ingot used in an embodiment.

FIG. 2 is a schematic perspective view illustrating an example of the Mg ingot used in the embodiment. An Mg ingot 11 is a piece or an ingot of Mg, which is formed by shaping metal Mg into a long plate-like shape. The Mg ingot 11 is made to have such a width and a thickness that the length and width of an Mg flake, which will be described later, will not be too large. For example, the Mg ingot 11 may have a thickness of approximately 100 mm or smaller and a width of approximately 200 mm or smaller. It is noted that the numerical values described in the present embodiment are mere examples, and the values are not limited thereto.

Figure 3:
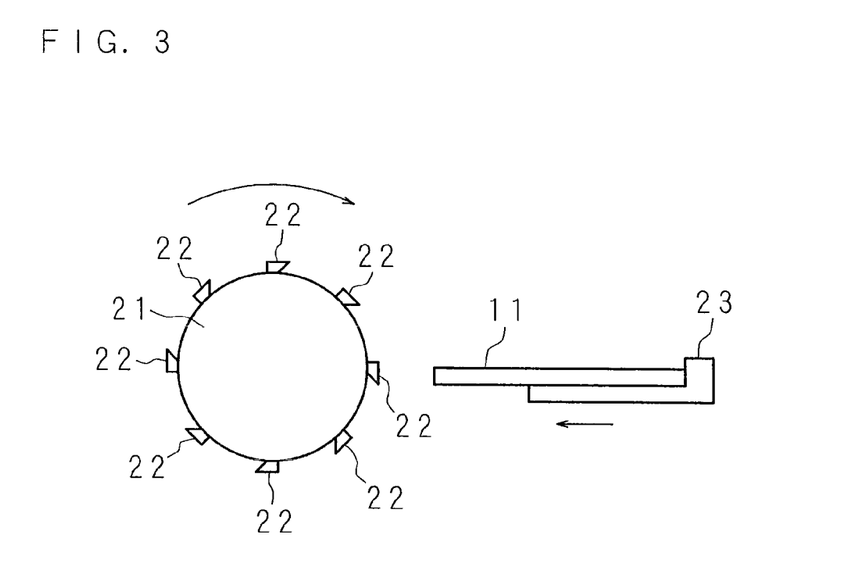
FIG. 3 is a schematic view illustrating a method of cutting an Mg ingot.

FIG. 3 is a schematic view illustrating a method of cutting the Mg ingot 11. A cutting apparatus for cutting the Mg ingot 11 includes a rotation drum 21 provided with a plurality of cutting blades 22, 22, ... on its circumferential surface, and a feeder 23 pressing the Mg ingot 11 to the rotation drum 21. Rotation of the rotation drum 21 causes the cutting blades 22, 22, ... to perform circular movement. The rotation drum 21 is constructed to be cooled by cooling water passing therethrough. The feeder 23 moves the Mg ingot 11 in a longitudinal direction and presses an end of the Mg ingot 11 to the rotating rotation drum 21. The cutting blades 22, 22, ..., which perform circular movement by rotation of the rotation drum 21, repeatedly cut the Mg ingot 11, which is pressed thereto, from its end. Here, the cutting blades 22 move in the direction of thickness or width of the Mg ingot 11 to scrape away an end of the Mg ingot 11. An end of the Mg ingot 11 is repeatedly cut by the cutting blades 22, 22, ... sequentially scraping away the end of the Mg ingot 11. Chips of the Mg ingot 11 scraped away by the cutting blades 22 will be Mg flakes. The cutting apparatus is constructed to have the rotation drum 21 and the feeder 23 in a globe box, so that cutting of the Mg ingot 11 may be performed in the atmosphere of inert gas such as argon gas or the like. To prevent explosion, it is desirable to perform cutting of the Mg ingot 11 in the atmosphere of inert gas.

Figure 4:
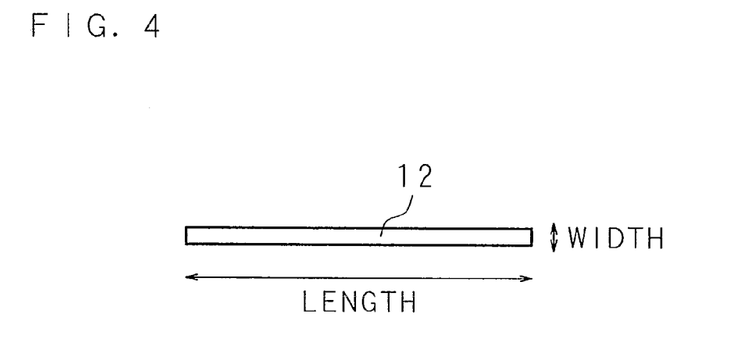
FIG. 4 is a schematic plan view illustrating an Mg flake made by cutting an Mg ingot.

FIG. 4 is a schematic plan view illustrating an Mg flake 12 made by cutting the Mg ingot 11. The Mg flake 12 is formed to have a long liner shape. The Mg flake 12 has a width of a size corresponding to the length of a cutting blade 22 in the direction of the axis of the rotation drum 21. Moreover, the length of the Mg flake 12 is a size corresponding to the thickness of the Mg ingot 11. For example, the width of the Mg flake 12 is between 1 mm and 3 mm, while the length of the Mg flake 12 is about 100 mm or less. The thickness of the Mg flake 12 is determined by the intervals of cutting blades 22, 22, ... placed on the circumferential surface of the rotation drum 21, the rotating speed of the rotation drum 21 and the feeding speed at which the Mg ingot 11 is fed by the feeder 23. In practice, the thickness of the Mg flake 12 is adjusted by controlling the feeding speed of the Mg ingot 11. The feeding speed of the Mg ingot 11 is so controlled that the thickness of the Mg flake 12 is between 20 µm and 30 µm. By forming the Mg flake 12 to have a liner shape, a large number of Mg flakes 12 may easily be accumulated because they intertwine with one another. They may also easily be deformed by compressing.

Figure 5:
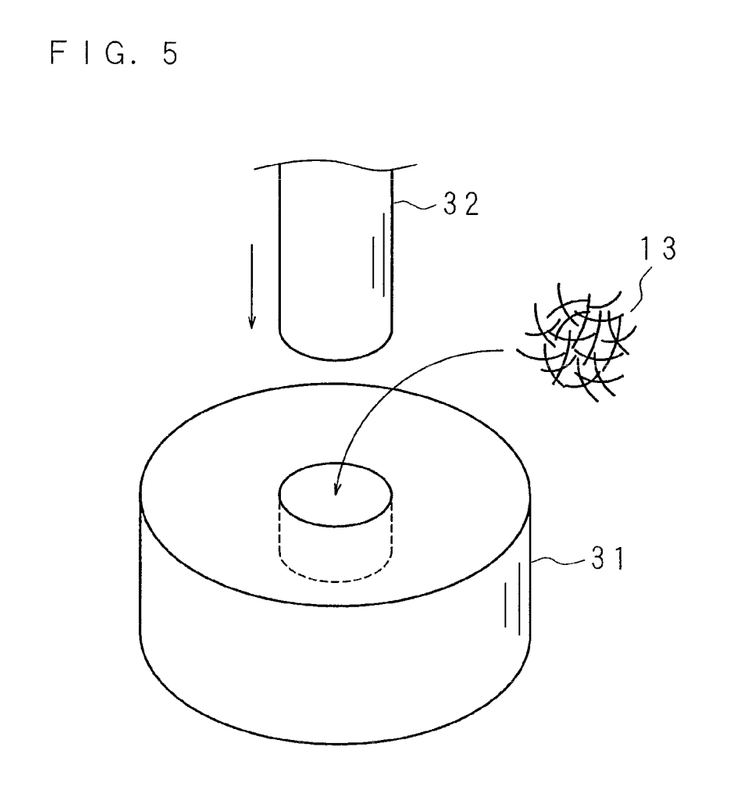
FIG. 5 is a schematic view illustrating a method of compressing and forming an Mg flake.
Figure 6:
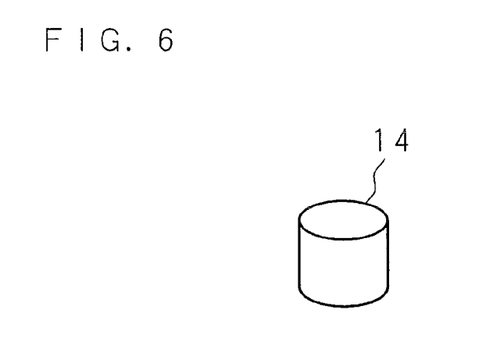
FIG. 6 is a schematic view illustrating an example of a compressed matter of Mg flakes.

FIG. 5 is a schematic view illustrating a method of compressing and shaping Mg flakes 12. An accumulated matter 13 formed by a number of accumulated Mg flakes 12 is put in a mold 31 to be pressed by a pressing machine 32. The accumulated matter 13 of Mg flakes 12 is compressed by pressing, thus forming a compressed matter made by compressing the accumulated matter 13 of Mg flakes 12. FIG. 6 is a schematic view illustrating an example of a compressed matter 14 of Mg flakes 12. The compressed matter 14 of Mg flakes 12 is formed to have a shape corresponding to the shape of the mold 31 in which the accumulated matter 13 of Mg flakes 12 was put. FIG. 6 illustrates an example where the compressed matter 14 of Mg flakes 12 is formed to have a columnar shape. The shape and size of the compressed matter 14 of Mg flakes 12 may be adjusted by changing the shape and size of the mold 31. While FIG. 6 illustrates an example where the compressed matter 14 of Mg flakes 12 is formed in a columnar shape, it may also be formed to have other shapes such as a bar, a plate, a rectangular parallelepiped and the like. In practice, the shape of the compressed matter 14 of Mg flakes 12 may be adjusted to be a suitable shape depending on a device which utilizes $MgH_2$. It is noted that an example is described where the pressing machine 32 is used for the method of compressing the accumulated matter 13, it is not limited thereto. Since there are a number of compression methods, another method such as a compression method using a roller and the like may also be used.

Figure 7:
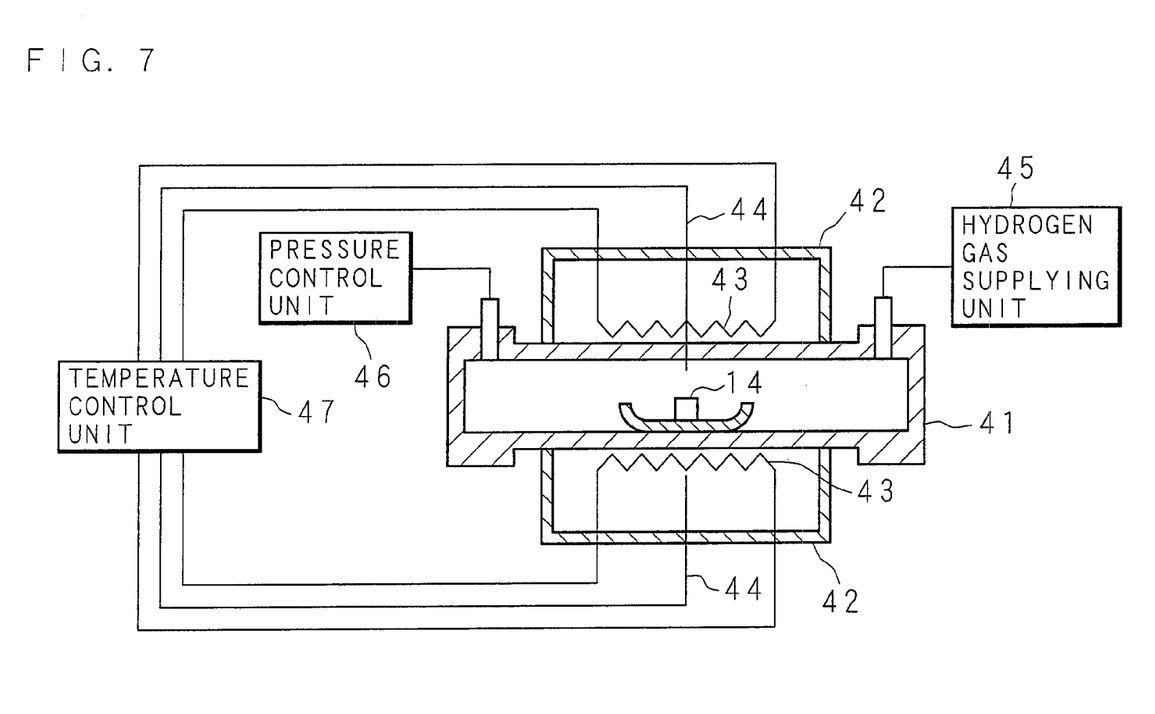
FIG. 7 is a schematic view illustrating a configuration example of a reaction apparatus for causing Mg to react with hydrogen gas.

FIG. 7 is a schematic view illustrating a configuration example of a reaction apparatus for causing Mg to react with hydrogen gas. The reaction apparatus is so constructed that a sealing container 41, which can seal the compressed matter 14 of Mg flakes 12 and high pressure hydrogen gas, is placed in a heating furnace 42. The sealing container 41 is a pressure-resistant container that can maintain its inside atmosphere at a high temperature and a high pressure, and is so constructed that the compressed matter 14 of Mg flakes 12 can be placed therein. Note that it is also possible to place a plurality of compressed matters 14 in the sealing container 41. Moreover, the sealing container 41 is provided with a hydrogen gas supplying unit 45 which includes a high pressure hydrogen cylinder, a pressure regulator and the like and which supplies high pressure hydrogen gas into the sealing container 41. Furthermore, the sealing container 41 is provided with a pressure control unit 46 including a decompressor and a microcontroller, which can control the pressure of hydrogen gas atmosphere in the sealing container 41 to be at an arbitrary pressure.

The heating furnace 42 is provided with heaters 43, 43 for heating the inside of the heating furnace 42, and temperature sensors 44, 44 which detect the temperature inside and outside of the sealing container 41. For the temperature sensors 44, 44, a thermocouple is used for example. The heaters 43, 43 and the temperature sensors 44, 44 are connected to a temperature control unit 47 including a power supply which supplies the heaters 43, 43 with electric current for heating, a microcontroller and the like. The temperature control unit 47 controls the temperature in the sealing container 41 to be at an arbitrary temperature. It is noted that the reaction apparatus may also be provided with a larger number of temperature sensors 44, 44.

Figure 8:
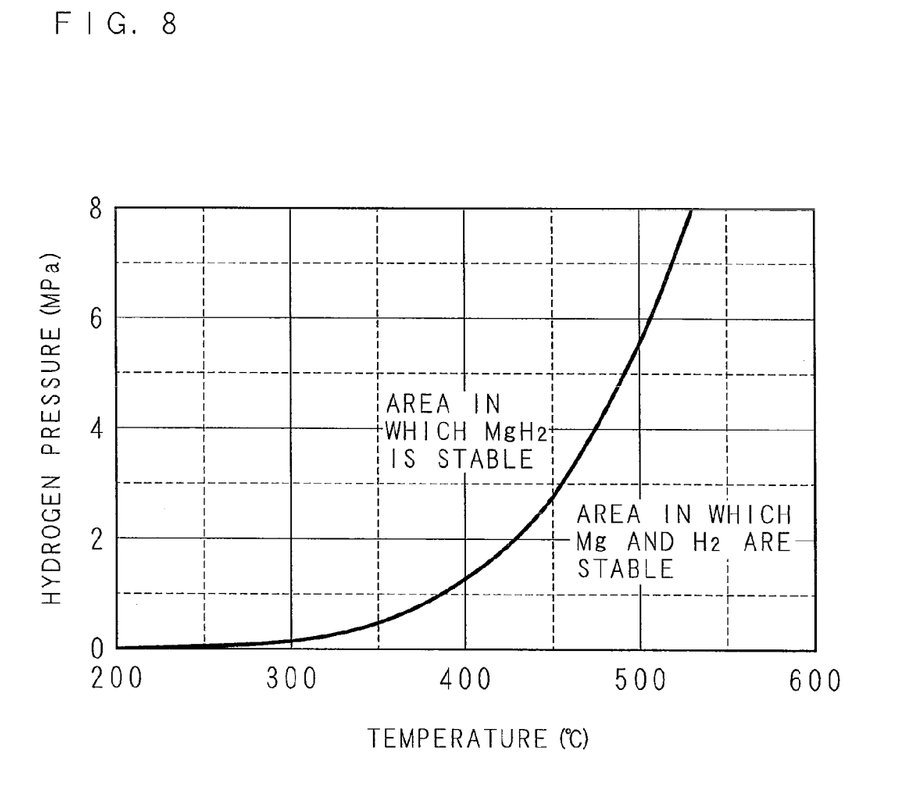
FIG. 8 is a simplified equilibrium diagram between Mg and hydrogen in the atmosphere of hydrogen gas.

In the reaction apparatus, a method disclosed in Japanese Patent Publication No. 4083786 is used to regulate the pressure and temperature of hydrogen gas atmosphere in the sealing container 41. That is, a method is used which once maintains the temperature and pressure of hydrogen gas at temperature and pressure at which Mg and $H_2$ are thermodynamically stable and then maintains them at temperature and pressure at which $MgH_2$ is thermodynamically stable. FIG. 8 is a simplified equilibrium diagram between Mg and hydrogen in the atmosphere of hydrogen gas. In the diagram, the horizontal axis indicates the temperature in the hydrogen gas atmosphere, whereas the vertical axis indicates the pressure in the hydrogen gas atmosphere. Since the reaction represented by the formula (1) in which Mg and $H_2$ combine to generate $MgH_2$ is a reversible reaction, there is an inverse reaction in which $MgH_2$ decomposes into Mg and $H_2$. The curved line in FIG. 8 indicates the equilibrium curve of the reaction and the inverse reaction of the formula (1). In the right side area of the equilibrium curve, the reaction in which $MgH_2$ decomposes into Mg and $H_2$ is more dominant. Mg and $H_2$ thermodynamically stably coexist in this temperature and pressure area. In the left side area of the equilibrium curve, the reaction in which Mg and $H_2$ combine to generate $MgH_2$ is more dominant. $MgH_2$ thermodynamically stably exists in this temperature and pressure area.

Figure 9:
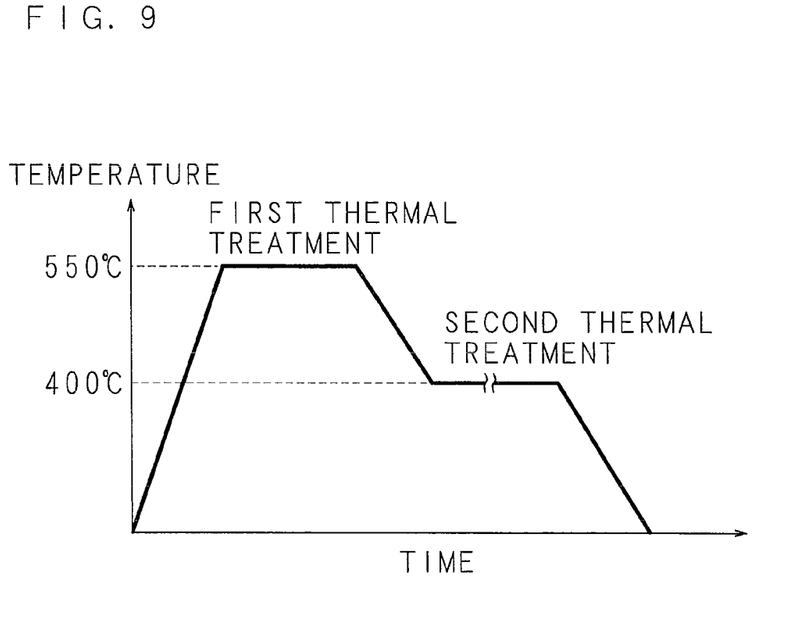
FIG. 9 is a characteristic diagram illustrating an example of a temperature history in which the temperature of hydrogen gas atmosphere is regulated to produce $MgH_2$.

FIG. 9 is a characteristic diagram illustrating an example of a temperature history in which the temperature of hydrogen gas atmosphere is regulated to produce $MgH_2$. The pressure control unit 46 maintains the pressure of the hydrogen gas atmosphere at 4 MPa, while the temperature control unit 47 raises the temperature of the hydrogen gas atmosphere from a room temperature to 550° C. Then, the first thermal treatment is performed that maintains the temperature at 550° C. which is higher than the temperature corresponding to 4 MPa on the equilibrium curve. In the first thermal treatment wherein the temperature and pressure area is the area in which Mg and $H_2$ stably coexist, reduction reaction by hydrogen gas removes the coating from the surface of Mg. Next, the pressure control unit 46 maintains the pressure of the hydrogen gas atmosphere at 4 MPa, while the temperature control unit 47 lowers the temperature of the hydrogen gas atmosphere to 400° C. Then, the second thermal treatment is performed that maintains the temperature at 400° C. which is lower than the temperature corresponding to 4 MPa on the equilibrium curve for a given period. In the second thermal treatment wherein the temperature and pressure area is the area in which $MgH_2$ is stable, Mg included in the compressed matter 14 of Mg flakes 12 reacts with hydrogen gas to generate $MgH_2$. It is noted that the values of temperature and pressure described here are mere examples, and they are not limited thereto. As long as a method is used that once maintains the temperature and pressure at which Mg and $H_2$ are stable and then maintains the temperature and pressure at which $MgH_2$ is to stable, other values may also be employed for the temperature and pressure.

By the method described above, a solid material of $MgH_2$ is produced. The produced solid material of $MgH_2$ has almost the same shape as the compressed matter 14 of Mg flakes 12 illustrated in FIG. 6, only expanded in its volume because Mg is replaced by $MgH_2$. When the compressed matter 14 of Mg flakes 12 is produced, the size of the compressed matter 14 may be so adjusted that the size of the solid material of $MgH_2$ is a size suitable for a machine that utilizes $MgH_2$, considering that the solid material of $MgH_2$ expands compared to the compressed matter 14. By putting the completed solid material of $MgH_2$ in water, the reaction of the formula (2) in which $MgH_2$ and water react to generate hydrogen gas occurs, generating hydrogen gas. For instance, a hydrogen generating apparatus may be realized that continuously generates hydrogen gas, which is to be used as a hydrogen gas source of a fuel battery, by sequentially putting solid materials of $MgH_2$ in water. The solid material of MgH$_2$ is formed to a given shape, facilitating its storage, transporting and handling in the hydrogen generating apparatus.

Figure 10:
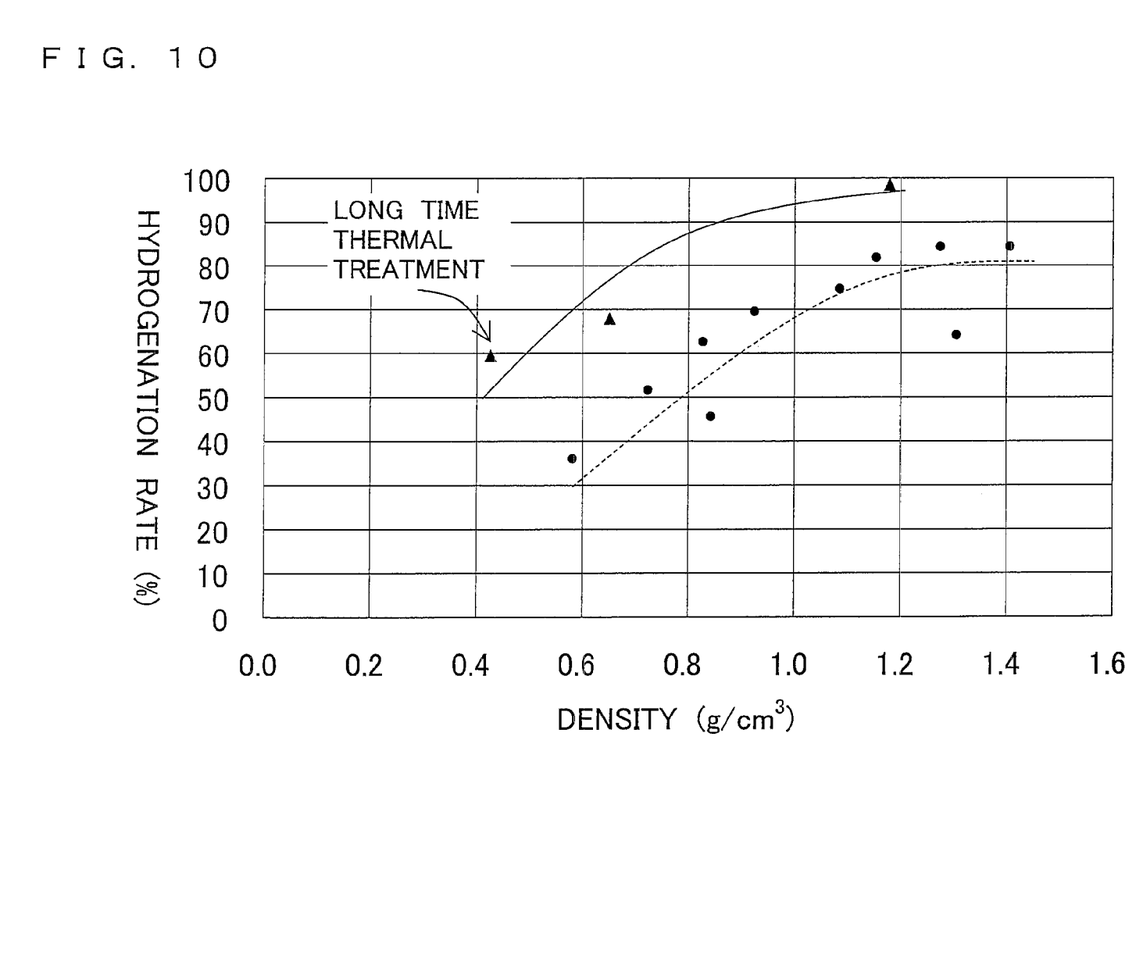
FIG. 10 is a characteristic view illustrating the hydrogenation rate of Mg according to an embodiment.

FIG. 10 is a characteristic view illustrating the hydrogenation rate of Mg according to the embodiment. In the embodiment, a solid material of MgH$_2$ is produced, while how much MgH$_2$ is hydrogenated from Mg included in a raw material is examined. The horizontal axis in FIG. 10 indicates the density of the compressed matter 14 of Mg flakes 12 made by compressing and shaping. The vertical axis indicates the rate of hydrogenation for the solid material of MgH$_2$ made by reaction of the compressed matter 14 with hydrogen gas in the reaction apparatus illustrated in FIG. 7 for each density of the compressed matter 14. The dots in the figure indicate the sample results with 30 hours of processing time in the second thermal treatment, whereas the triangles in the figure indicate the sample results with a longer processing time of 45 hours in the second thermal treatment. The hydrogenation rate is calculated by the following formula (3). In the formula (3), the numeral 26 is the molecular weight of MgH$_2$, while 24 is the atomic weight of Mg.

Hydrogenation rate=(measurement mass of produced solid material of MgH$_2$)/{(measurement mass of compressed matter of Mg flakes×(26/24)} (3)

To utilize the produced solid material of MgH$_2$ as a hydrogen source, it is desirable to have a higher hydrogenation rate. According to FIG. 10, the hydrogenation rate increases as the density of the compressed matter 14 of Mg flakes 12 becomes higher, and as the processing time of the second thermal treatment becomes longer. Higher density increases pressure on each of the Mg flakes 12, causing distortion in each Mg flake 12. The distortion makes it easier for hydrogen gas to penetrate the Mg flakes 12, which facilitates reaction of Mg atom in the Mg flakes 12 with hydrogen atom and thus presumably increases the rate of hydrogenation. However, if the density of the compressed matter 14 approaches 1.72 g/cm$^3$, which is the density of a single Mg, the hydrogenation rate increases at a slower pace and decreases at the end. This is presumably because, as the density of the compressed matter 14 approaches the density of a single Mg, it becomes difficult for hydrogen gas to penetrate the Mg flakes 12. If the density of the compressed matter 14 of Mg flakes 12 is between 0.8 g/cm$^3$ and 1.5 g/cm$^3$, the hydrogenation rate of 50% or higher may be assured. Hence, it is desirable for the compressed matter 14 of Mg flakes 12 to be compressed such that the density thereof is in the range between 0.8 g/cm$^3$ and 1.5 g/cm$^3$. Moreover, if the density of the compressed matter 14 is between 1.0 g/cm$^3$ and 1.5 g/cm$^3$, the hydrogenation rate of 70% or higher may be attained.

As described above, according to an aspect of the embodiment, the Mg ingot 11 is cut to make the Mg flakes 12. Then, a number of Mg flakes 12 are compressed and shaped to form the compressed matter 14 of Mg flakes 12. Subsequently, the compressed matter 14 of Mg flakes 12 is reacted with hydrogen gas to produce a solid material of MgH$_2$. Unlike powder, since the Mg flake 12 has a low risk of dust explosion, MgH$_2$ can be produced with greater safety. The particle diameter of current small size Mg powder ranges from 75 μm to 150 μm, while the thickness of the Mg flake 12 which has a lower risk of dust explosion is 150 μm or smaller which is equal to or smaller than the particle diameter of Mg powder. It is also possible to have a thickness less than 75 μm which is smaller than the particle diameter of Mg powder. In the embodiment, for example, the thickness of the Mg flake 12 is between 20 μm and 30 μm. As the Mg flake 12 becomes thinner, Mg reacts with hydrogen gas more easily, allowing enhancement in yield of MgH$_2$ to be produced. Moreover, yield of MgH$_2$ is improved by compressing Mg flakes 12, allowing enhancement in production efficiency of MgH$_2$.

Furthermore, the Mg ingot 11, from which Mg flakes 12 are made, is usually generated with an approximately homogeneous configuration. Hence, by cutting the Mg ingot 11, a large number of Mg flakes 12 with uniform components may readily be formed. Since the components of the Mg flakes 12 may be formulated by simply formulating the components of the Mg ingot 11, quality formulation of MgH$_2$ may readily be attained. Moreover, since the Mg flake 12 is formed with a linear shape, it is easier to accumulate a number of Mg flakes 12 compared to other shapes such as a plate-like shape. Compression thereof may also be easy since it can easily be deformed. It is thus possible to form the compressed matter 14 of Mg flakes 12 to a desired shape. Moreover, because the compressed matter 14 of Mg flakes 12 is formed using a mold at compression, it is possible to determine the shape of the produced solid material of MgH$_2$ to be a certain shape. The solid material of MgH$_2$ may also be formed to have an optimal shape which can readily be used in a hydrogen generating apparatus, enabling effective generation of hydrogen gas. Moreover, the hydrogen generating apparatus may be made smaller.

It is noted that, though the Mg ingot 11 has a plate-like shape while the Mg flake 12 has a linear shape in the embodiment, the Mg ingot 11 and the Mg flake 12 may also have other shapes. For example, the Mg ingot 11 may have a round bar-like shape while the Mg flake 12 may have a circular sheet-like shape made by scraping away the round bar-shaped Mg ingot 11 from its end. Moreover, the present embodiment described an example where a single Mg is used as a raw material to produce MgH$_2$. In an embodiment, however, a material in which a metal or non-metal element is added to metal Mg may also be used as a raw material to produce a magnesium-based hydride including MgH$_2$.

Embodiment 2

The numerical values described in Embodiment 1 are mere examples, and they are not limited thereto. The following method may also be used. The density of the compressed matter may be between 0.4 g/cm$^3$ and a value less than 0.8 g/cm$^3$. It is also possible to produce a magnesium-based hydride with the hydrogenation rate between 30% to a value less than 50% by setting the density of the compressed matter to be between 0.4 g/cm$^3$ and a value less than 0.8 g/cm$^3$, and by causing a component in the compressed matter to react with hydrogen gas in the atmosphere of hydrogen gas.

Figure 11:
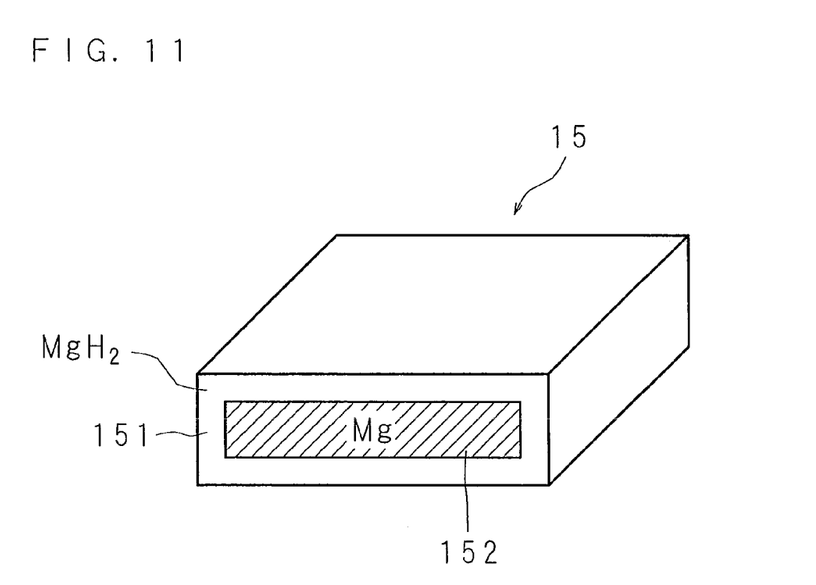
FIG. 11 is a schematic section view illustrating a cross-section of a magnesium-based hydride after thermal treatment.

FIG. 11 is a schematic section view illustrating a cross-section of a magnesium-based hydride after thermal treatment. The reference number 15 denotes a part of a magnesium-based hydride which underwent the compression process and the thermal treatment described in Embodiment 1. The magnesium-based hydride 15 includes an Mg portion 152 and an MgH$_2$ portion 151 covering the outer circumference of the Mg portion 152. As illustrated in FIG. 11, in the cross section of the magnesium-based hydride 15, the Mg portion 152 is present at the central part while the MgH$_2$ portion 151 is covering the outer circumference of the Mg portion 152. By increasing the rate of compression, a larger area is occupied by the MgH$_2$ portion 151. The percentage of the MgH$_2$ portion 151 is also increased by extending the time of thermal treatment. Note that the percentage of the MgH$_2$ portion 151 is increased by both increasing the compression rate and extending the time of thermal treatment. Increase of the MgH$_2$ portion 151 allows enhancement in yield.

Rise of the compression rate, however, causes increase of time required for compression and increase of cost. Moreover, longer time of thermal treatment allows enhancement in the rate of hydrogenation. This also, however, causes increase of time required for thermal treatment and increase of cost. As a result of continuous study, the inventor has found that sufficient hydrogen can be obtained while assuring safety and reducing time and cost, if the density of the compressed matter is between 0.4 g/cm$^3$ and a value less than 0.8 g/cm$^3$. Moreover, by setting the density of the compressed matter to be between 0.4 g/cm$^3$ and a value less than 0.8 g/cm$^3$ and by causing a component in the compressed matter to react with hydrogen gas in the atmosphere of hydrogen gas, the magnesium-based hydride 15 with the hydrogenation rate ranging from 30% to a value less than 50% is produced. The inventor has found that, with such a magnesium-based hydride 15, sufficient hydrogen can be obtained while assuring safety and reducing time and cost.

For example, when water vapor of 100° C. is directed to the magnesium-based hydride 15, the reaction represented by the formula (2) occurs on the MgH$_2$ portion 151 at the outer circumference, generating 2H$_2$. Moreover, at the Mg portion 152 inside, the reaction represented by the following formula (4) occurs.

$$Mg + H_2O \rightarrow MgO + H_2 \quad (4)$$

It is noted that the formula (4) breaks down to the following formula (5) and formula (6).

$$Mg + 2H_2O \rightarrow Mg(OH)_2 + H_2 \quad (5)$$

$$Mg(OH)_2 \rightarrow MgO + H_2O \quad (6)$$

Reaction starts to occur for the MgH$_2$ portion 151 at the outer circumference, which generates reaction heat transferred to the inside Mg portion 152, causing the reaction represented by the formula (4). This generates H$_2$. As represented by the formulas (2) and (4) described above, 2H$_2$ and H$_2$ can be obtained. Furthermore, the inventor has conducted tests to confirm that the density of 0.4 g/cm$^3$ or larger and the hydrogenation rate of 30% or higher can prevent the circumferential MgH$_2$ portion 151 from cracking, thus protecting the inside Mg portion 152. For example, assume that the length, width and depth of the magnesium-based hydride 15 are 5 cm, 10 cm and 10 cm, respectively, while the volume thereof is 500 cm$^3$.

In order to secure the hydrogenation rate of 30% or higher, it is required for the volume of the MgH$_2$ portion 151 to be 150 cm$^3$ or larger. For example, assume that the length, width and depth of the Mg portion 152 are 4.1 cm, 9.1 cm and 9.1 cm, respectively. Here, the thickness of the MgH$_2$ portion 151 is 0.45 cm in the lengthwise, widthwise or depth direction. The volume of the Mg portion 152 is 339.521 cm$^3$, while the volume of the MgH$_2$ portion 151 is 160.479 cm$^3$. This ensures the hydrogenation rate of 30% or higher.

The thickness of the MgH$_2$ portion 151 is further made thinner. In the above-described example, assume that the length, width and depth of the Mg portion 152 are 4.2 cm, 9.2 cm and 9.2 cm, respectively. Here, the thickness of the MgH$_2$ portion 151 is 0.4 cm in the lengthwise, widthwise or depth direction. The volume of the Mg portion 152 is 355.488 cm$^3$, while the volume of the MgH$_2$ portion 151 is 144.512 cm$^3$. The hydrogenation rate goes down to approximately 28.9%. Since the hydrogenation rate is 30% or lower, there is a risk of a crack occurring on the outer circumference of the magnesium-based hydride 15. This exposes the inside Mg, causing a fire.

As described above, a given strength is secured while the Mg portion 152 which has a risk of firing is coated by the MgH$_2$ portion 151 which is chemically stable. Hence, abundant hydrogen can be obtained while production cost and time are reduced. Moreover, the magnesium-based hydride 15 with high security may be produced.

Furthermore, MgO generated at the formula (4) may be reacted with carbon dioxide to stably fix it as magnesium carbonate. The MgO which underwent the reaction of the formula (4) is extracted to react with CO$_2$ as represented by the formula (7).

$$MgO + CO_2 \rightarrow MgCO_3 \quad (7)$$

Since CO$_2$ is thus fixed as magnesium carbonate, it may be reused as a medicine, an antislipping agent, an industrial material or the like. Moreover, this eliminates the need for expensive storage of carbon dioxide underground.

Though the magnesium-based hydride 15 with a columnar shape or a quadrangular shape is described as an example in the embodiment, its shape is not limited thereto. As long as the surface area is expandable, the other shapes may also be employed. For example, the surface of the magnesium-based hydride 15 may have convexes and concaves. In this case, the mold 31 having a surface with concaves and convexes corresponding to the convexes and concaves of the surface of the magnesium-based hydride 15 is used. Moreover, the magnesium-based hydride 15 may have a doughnut shape. In this case, a cylindrical holder is used to penetrate the inner circumferential part of the magnesium-based hydride 15. Likewise, the inner circumferential parts of a plurality of magnesium-based hydrides 15, 15, . . . are penetrated by the cylindrical holder. This facilitates transporting and utilization of a plurality of magnesium-base hydrides 15.

Since Embodiment 2 is as described above while the other details thereof are similar to those in Embodiment 1, corresponding parts are indicated by the same reference numbers and detailed description thereof will not be repeated.

Embodiment 3

The magnesium-based hydride 15 obtained by undergoing the compression and heating processes may also be a form of powder. The magnesium-based hydride 15 produced by causing a component in the compressed matter 14 to react with hydrogen gas in the atmosphere of hydrogen gas is input to a crushing machine. It is noted that, compared to Mg, MgH$_2$ is fragile and easy to be crushed. For the crushing machine, a uniaxial type, a biaxial type, a hammer type or the like may be used. The crushing machine crushes the magnesium-based hydride 15 to pieces, each piece being approximately a few millimeters.

Subsequently, the crushed magnesium-based hydride 15 is input to a grinding machine to produce powder-like magnesium-based hydride 15. For the grinding machine, a grinder that can obtain a particle diameter of approximately several tens of micromillimeters or a micronizer that can grind the magnesium-based hydride 15 to powder with a particle diameter of several micromillimeters or smaller is used. This enables the user to obtain the magnesium-based hydride 15 in a form of powder with a given particle diameter in accordance with the user's needs.

Since Embodiment 3 is as described above while the other details thereof are similar to those in Embodiments 1 and 2, corresponding parts are indicated by the same reference numbers and detailed description thereof will not be repeated.

According to the present invention, a magnesium-based hydride may effectively be produced. The magnesium-based hydride produced according to the present invention may be used as a hydrogen generating source for a fuel battery to be utilized as an efficient energy source.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of producing $MgH_2$ in which a material including magnesium is combined with hydrogen, comprising:

making a compressed matter by accumulating and compressing a plurality of flakes including magnesium; and producing $MgH_2$ by causing a component in said compressed matter to react with hydrogen gas in an atmosphere of hydrogen gas;

wherein each of said flakes has a thickness of 150 μm or smaller; and wherein said compressed matter has a density of a value between 0.4 $g/cm^3$ and 1.5 $g/cm^3$.

2. The method of producing $MgH_2$ according to claim 1, wherein said flakes are made by repeatedly cutting an ingot including magnesium.

3. The method of producing $MgH_2$ according to claim 1, wherein each of said flakes has a linear shape.

4. The method of producing $MgH_2$ according to claim 1, wherein, when said compressed matter is made, said flakes are accumulated in a mold and are compressed to form said compressed matter.

5. The method of producing $MgH_2$ according to claim 1, wherein said compressed matter has a density of a value between 0.4 $g/cm^3$ and a value less than 0.8 $g/cm^3$, and the produced $MgH_2$ includes an Mg portion and a $MgH_2$ portion covering an outer circumference of the Mg portion.

6. The method of producing $MgH_2$ according to claim 1 further comprising:

crushing the produced $MgH_2$; and grinding the crushed $MgH_2$ to produce powder-like $MgH_2$.

* * * * *